United States Patent Office 2,959,306
Patented Nov. 8, 1960

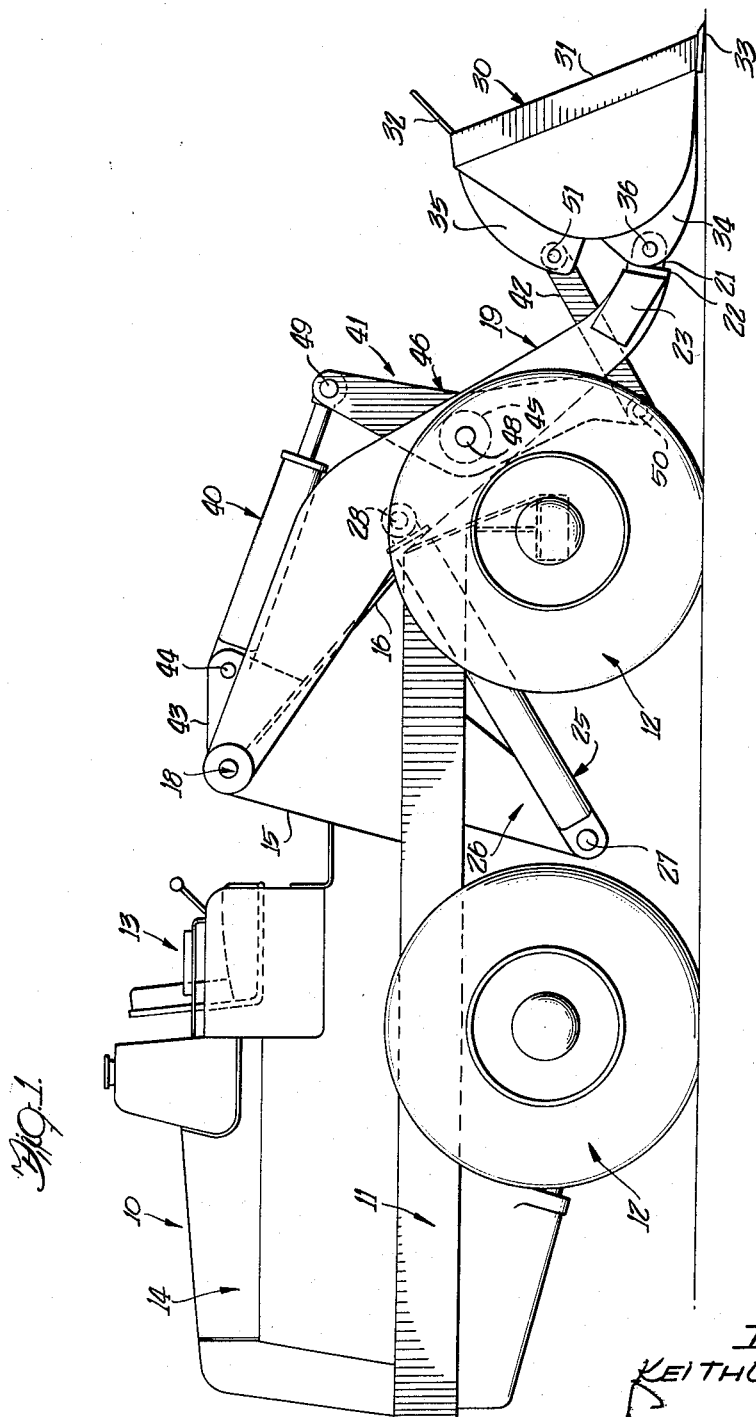

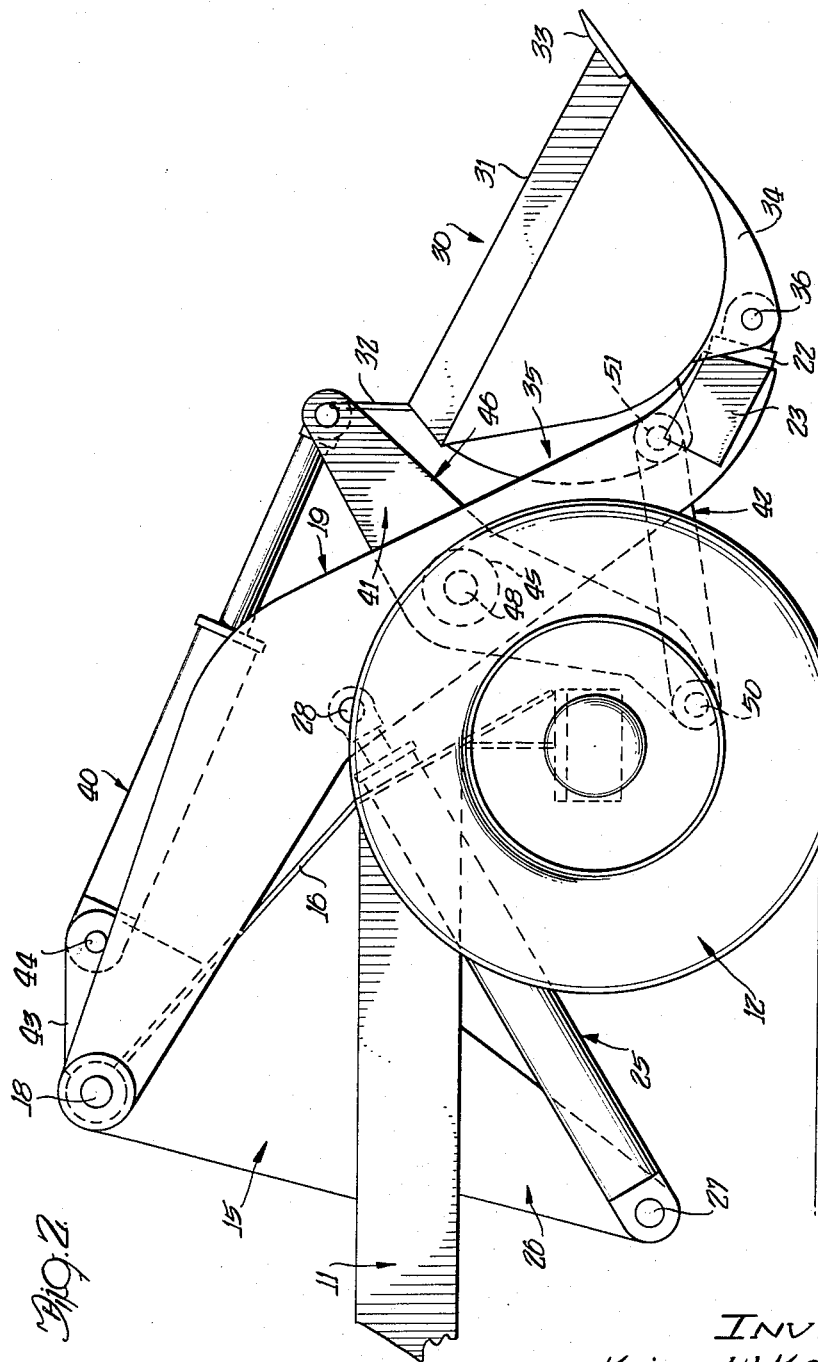

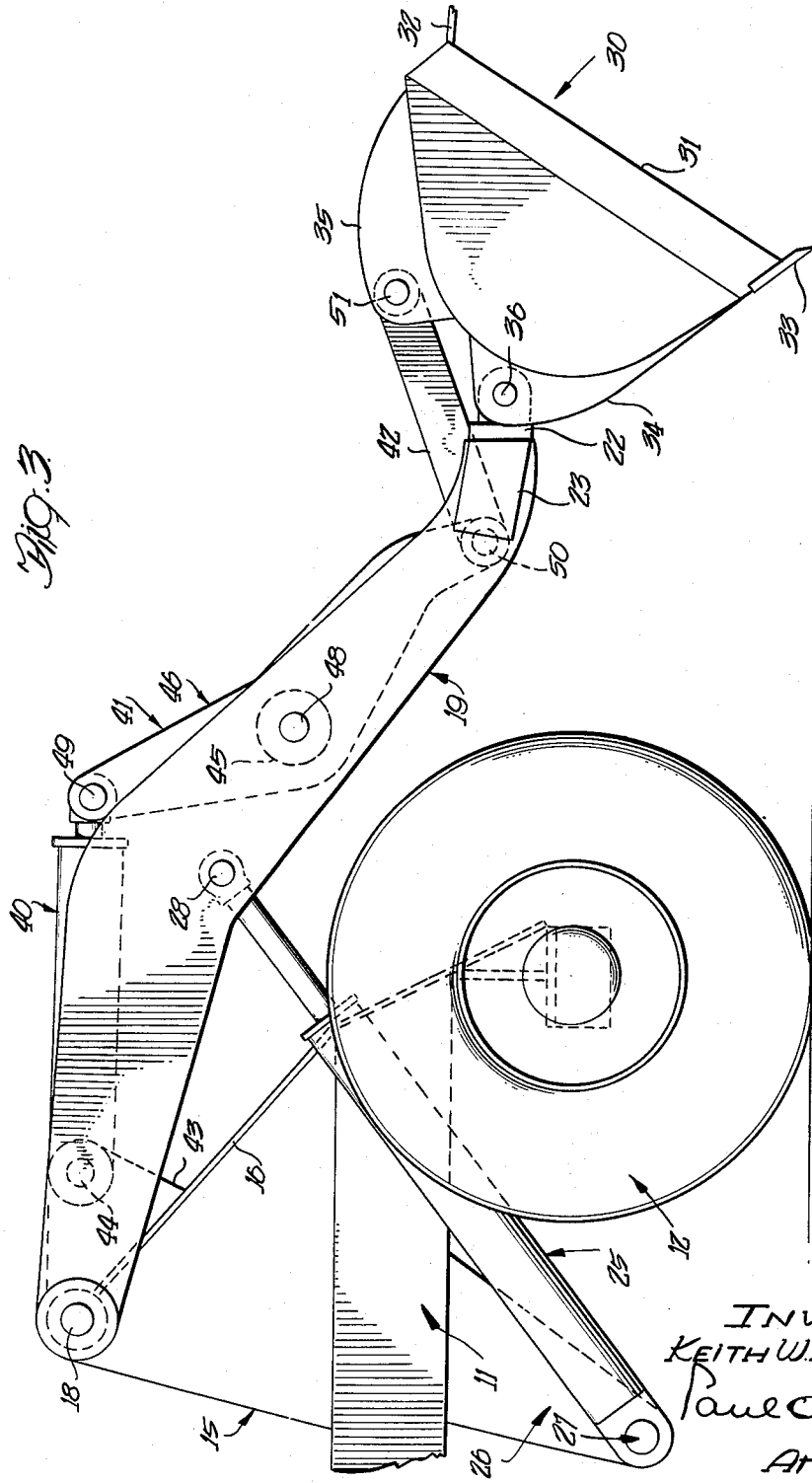

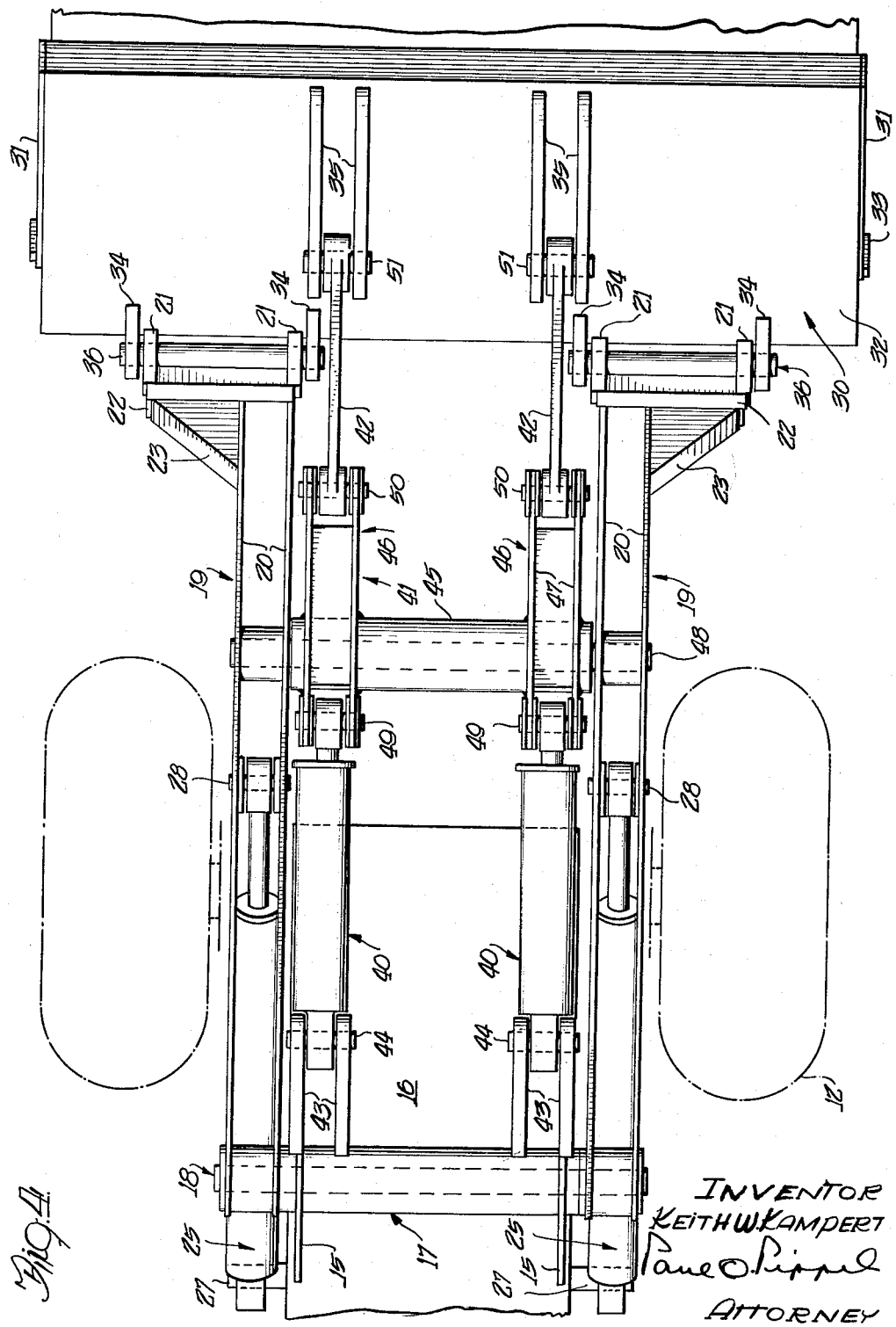

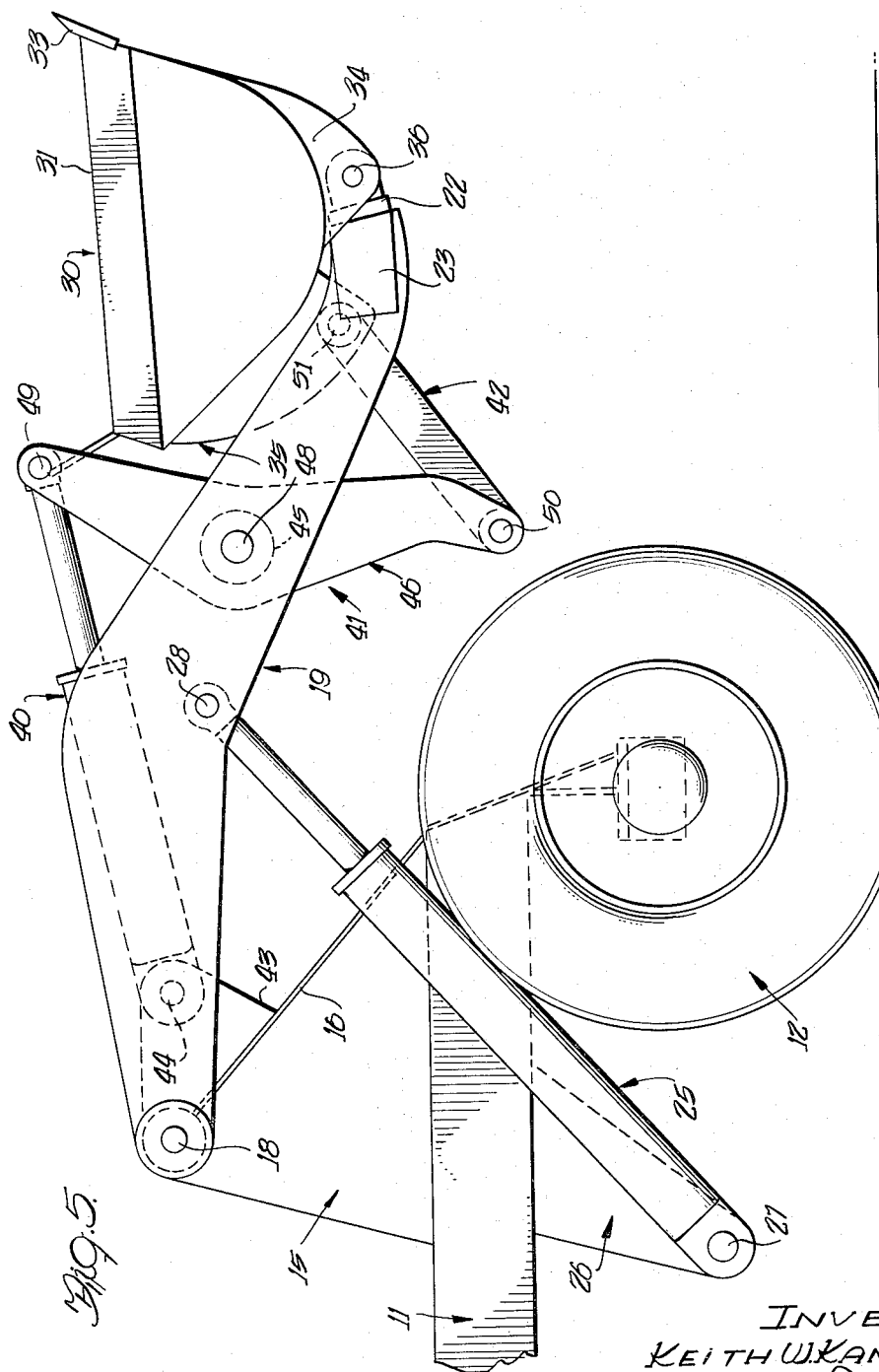

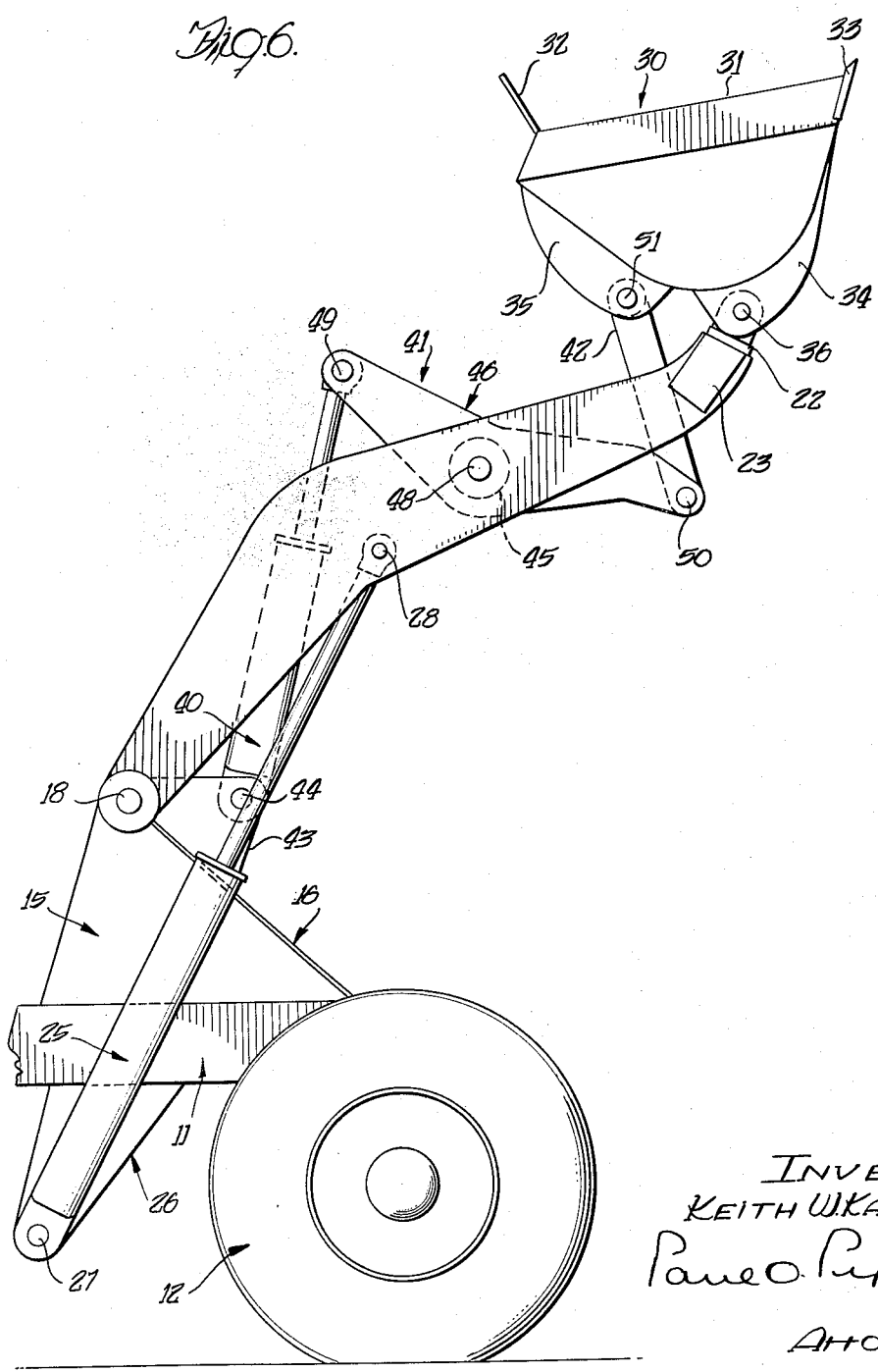

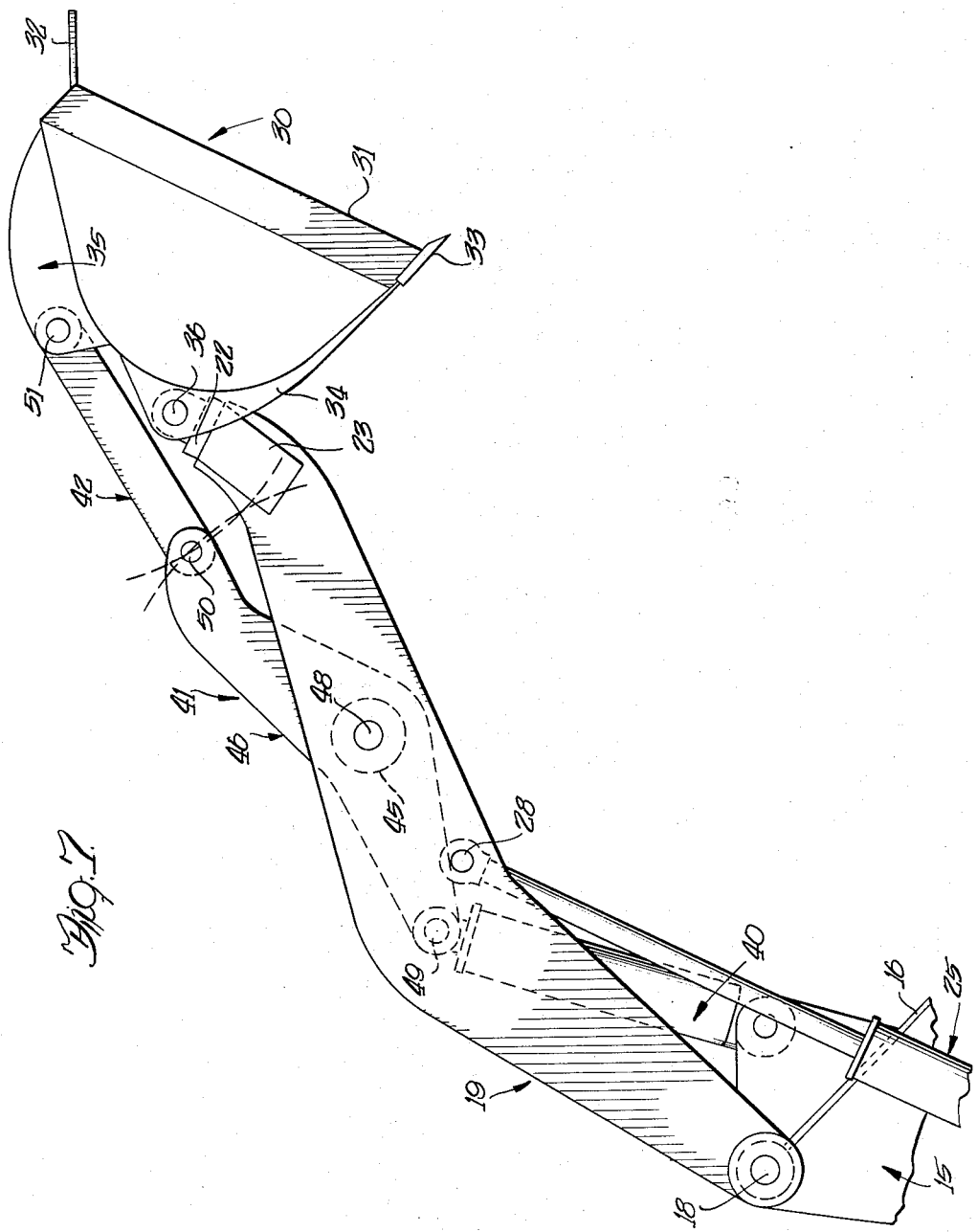

2,959,306
TRACTOR LOADERS

Keith W. Kampert, Libertyville, Ill., assignor to The Frank G. Hough Co., a corporation of Illinois Filed Aug. 18, 1958, Ser. No. 755,669

6 Claims. (Cl. 214—140)

This invention relates generally to tractor loaders, and more specifically to improved boom and linkage means for a front end type tractor loader wherein a feature of the improvement is the relatively light construction of the boom.

Front end type tractor loaders as generally known in the art, comprise a tractor having a boom which is usually formed in duplicate portions disposed on each side of the tractor, having a bucket pivotally carried on the forward end of each portion of the boom transversely of the tractor, and having some type of linkage means interconnecting the tractor, the boom and the bucket for pivoting the bucket to various operative positions relative to the boom. As the engines of these front end type tractor loaders have increased in size and development, relatively large amounts of power have become available for operation of the tool or bucket. Since the boom and linkage means are generally formed in duplicate portions on each side of the tractor, there inherently exists the possibility that one portion of the boom and linkage on one side of the tractor will be subjected to greater reaction forces than the other in the various material handling or digging operations of the loader with consequent twisting and bending of the various members, these twisting and bending forces produce a detrimental effect upon the loader structure to greatly shorten the life thereof and increase the maintenance costs thereof. The resultant twisting and bending is further actually compounded by the loader, since the various members on each side of the tractor are usually operated by separate hydraulic rams. When a ram on one side of the tractor is stopped by a substantial reaction force, the ram on the other side of the tractor will continue to operate until the hydraulic pressure in the system reaches that for which the pressure relief valve is set to open. This stopping of one of the hydraulic rams and continuing operation of the other until the pressure relief valve opens will cause a twisting and bending of the loader members. The obvious solution, that of merely strengthehning each of the members or elements of the loader combination commensurate with the available power is not a good solution since the result would be a tractor loader that is excessively heavy and one in which the permissible load which may be carried without seriously unbalancing the machine is greatly lessened.

It is the object of the present invention to provide a certain loader arrangement for a front end type tractor loader which will permit the use of relatively light boom arms on each side of the tractor.

It is a further object of the present invention to provide a front end type tractor loader with a certain linkage arrangement for pivoting the bucket or tool of the loader, which linkage arrangement includes a pair of hydraulic rams on each side of the tractor, and which will provide for uniform operation of those hydraulic rams under any unequal loading conditions on the bucket.

A further object of the present invention is to provide an arrangement for a pair of boom arms in a front end type tractor loader which may be of relatively light construction and wherein twisting of the boom arms by any load on one side or other of the bucket is minimized and wherein uniform operation of both of the hydraulic rams for the linkage means is provided under any unequal loading conditions on the bucket.

Other objects and features of the present invention will be apparent upon a perusal of the following specification and drawings of which:

Figure 1 is a side elevational view of a tractor loader constructed according to the present invention;

Figure 2 is a partial enlarged side elevational view of the structure shown in Figure 1 with the bucket pivoted to the break out position;

Figure 3 is an enlarged partial side elevational view of the structure shown in Figure 1 with the bucket dumped at ground level;

Figure 4 is a top plan view of the structure shown in Figure 3;

Figure 5 is an enlarged partial side elevational view of the structure shown in Figure 1 with the boom and bucket raised to a normal travel position;

Figure 6 is a partial enlarged side elevational view of the structure shown in Figure 1 with the boom raised to the high lift carrying position, and Figure 7 is an enlarged partial side elevational view of the structure shown in Figure 1 with the boom raised to the high lift position and with the bucket in the dump position.

The present embodiment is the preferred embodiment but it is to be understood that changes can be made in the present embodiment by one skilled in the art without departing from the spirit and scope of the present invention.

For a general description of the present invention reference is made to the drawings. The tractor which is of the four wheel rubber tired type is constructed with the forward portion thereof being formed as an open platform. The loader mechanism is mounted upon this platform. The loader mechanism comprises a pair of boom arms disposed on each side of the tractor with the rearward end of each boom arm being pivotally connected to an upstanding plate assembly. The forward end of each boom arm is provided with a bracket carrying a pair of relatively widely spaced bearings carrying a pin which in turn is suitably connected to flanges on the rear wall of the bucket. The spacing of the bearings is substantially greater than the transverse thickness of the boom arms. The boom arms are not rigidly interconnected. The boom arms are, of course, interconnected through the plate assembly on the tractor and through the bucket at the forward end of each boom arm. A pin or shaft is provided between the boom arms intermediate the ends thereof, but this shaft does not serve to rigidly interconnect or reinforce the boom arms but merely is provided for rotatively carrying a cylindrical member for the linkage means. The linkage means comprises a pair of hydraulic rams, a lever assembly, and a pair of links. The lever assembly comprises a pair of levers, which are rigidly secured intermediate their ends on a cylindrical member which is rotatively carried on the shaft between the boom arms. The links are pivotally connected between the ends of the levers and the bucket, and the pair of hydraulic rams are pivotally connected between the tractor and the other ends of the levers. The cylindrical member and the levers form a rigid assembly such that when one of the linkage hydraulic rams is extended or retracted a certain amount, the other linkage hydraulic ram must extend or retract a corresponding amount irrespective of any different loading on the links connected to the bucket. With the above described loader arrangement the boom arms may be of a relatively light construction, and considering one condition which exerts twisting moments on the loader, that when the bucket is moved to engage a load and one outer corner of the bucket is caught under some object such as a large rock, the boom assembly with the wide brackets on the back of the bucket will distribute the load over the width of the bucket, and as the linkage hydraulic rams are contracted the bucket must by virtue of the linkage means construction pivot rearwardly without causing a twisting of the various members.

A further result produced by the present invention is a snubbing or throw out action of the bucket when it is completely dumped from the high carrying position.

Turning next to a detailed description of the present invention reference is again made to the drawings. The tractor 10 comprises a frame 11 which is supported by four wheels 12. The forward end of the frame 11 terminates substantially immediately above the axle for the forward wheels of the tractor 10. The forward portion of the frame 11 is formed to have a substantially open platform thereupon and the operator's compartment 13 is disposed immediately rearwardly thereof. The engine compartment 14 is carried on the frame 11 rearwardly of the operator's compartment 13 and at the rearward portion of the tractor 10.

The loader is carried upon a pair of triangular plates 15 which are mounted on each side of the open platform portion of the frame 11 at the forward end of the tractor to upstand therefrom. A plate 16 is secured between the forward facing edges of the plates 15 to reinforce the assembly. A tubular member 17 is carried by the plates 15 at the upper ends thereof transversely of the tractor 10. The tubular member 17 carries a pin 18 for pivotally carrying the boom arms 19.

Each of the boom arms 19 is formed of a pair of relatively light plates 20 which may be mounted in a spaced-apart relationship to each other by any means commonly known in the art. The rearward end of each boom arm 19 is pivotally carried on the pin or shaft 18 and each boom arm 19 extends over the open platform at the forward end of the tractor and forwardly of the tractor. The forward end of each boom arm 19 is provided with a pair of bearings or flanges 21 which are carried in a relatively wide spaced-apart relationship to each other on a plate 22. Each plate 22 is secured to the forward end of one of the boom arms 19 and extends transversely outwardly from the side of the tractor 10. The plates 22 are reinforced by triangular plates 23 secured between the plates 22 and the boom arms 19. A pair of hydraulic rams 25 is provided for raising and lowering the boom arms 19. Each of the hydraulic rams 25 is pivotally connected at the head end thereof to a flange 26 by means of pivotal mounting means 27. Each of the flanges 26 is secured to one side of the frame 11 to depend therefrom. The rod end of each hydraulic ram 25 is pivotally connected to one of the boom arms 19 between the plates 20 thereof by means of a pin 28. The pins 28 are positioned on the boom arms 19 intermediate the ends thereof as may easily be seen in the drawings. Thus it may be seen that when the hydraulic rams 25 are extended, the forward end of the boom arms 19 are raised, and then these rams are retracted the forward end of the boom arms 19 are lowered.

The bucket 30 of the present invention may be of any suitable type known in the art. In the present embodiment, the bucket 30 comprises a pair of spaced-apart side walls 31 inter-connected by a curved plate 32 which forms the rear and bottom walls of the bucket 30. A cutting edge 33 is secured to the forward marginal edge of the bottom wall of the bucket 30. The bucket 30 is further provided with two pairs of flanges 34 and two pairs of flanges 35. Each pair of flanges 34 is mounted on the lower rear wall of the bucket 30 transversely thereof. The flanges of each pair of flanges 34 are spaced apart a distance slightly greater than the spacing between the bearings 21 on the forward end of the boom arms 19. Pins 36 carried by the flanges 34 and journalled through the bearings 21 provide for the pivotal mounting of the bucket 30 on the forward end of the boom arms 19. Each pair of flanges 35 is mounted on the upper rear wall of the bucket 30 transversely thereof as can easily be seen in Figure 4.

The linkage means of the present invention is provided for pivoting and holding the bucket 30 in various positions relative to the boom arms 19. The linkage means additionally provides a load scooping action to aid in the filling of the bucket 30 with the material being worked. The linkage means comprises a pair of hydraulic rams 40, a lever assembly 41 and a pair of links 42. Each of the hydraulic rams 40 is pivotally connected at the head end thereof between a pair of flanges 43 by means of a pin 44. Each pair of flanges 43 is mounted on the plate 16 to upstand therefrom substantially at the upper end of the plate 16, and is positioned so that the pins 44 are positioned substantially horizontally forwardly of shaft 18. The rod end of each hydraulic ram 40 is pivotally connected to the lever assembly 41. The lever assembly 41 comprises a tubular or cylindrical member 45 rigidly carrying a lever 46 at each end thereof. Each lever 46 comprises a pair of plates 47 which are secured in a spaced apart relationship intermediate their ends on the tubular member 45 by any means such as welding. The tubular member 45 is rotatably carried on an extended pin or shaft 48. The shaft 48 is carried by and extends between the boom arms 19. Pins 49 are provided for pivotally interconnecting the rod end of each hydraulic ram 40 and one end of each of the levers 46 of the lever assembly 41. Each of the links 42 is pivotally connected at one end thereof to the other end of one of the levers 46 of the lever assembly 41 by means of a pin 50. The other end of each link 42 is pivotally connected between one pair of the flanges 35 by means of a pin 51. Specifically referring to Figure 1 it may thus be seen that when the hydraulic rams 40 are retracted, the lever assembly 41 is rotated counter-clockwise about shaft 48 to pivot the bucket 30 through the links 42 clockwise about pins 36, and when the hydraulic rams 40 are extended, the lever assembly 41 is rotated clockwise to move the links 42 to in turn pivot the bucket 30 counterclockwise about pins 36.

Suitable hydraulic fluid pump means, reservoir means, and conduits (not shown) are provided and connected to the hydraulic rams 25 and 40 for selective operation thereof.

Turning next to a description of the operation of the instant invention in order that the construction thereof may be more readily understood, reference is again made to the drawings. As shown in Figure 1, the hydraulic rams 25 are substantially completely retracted and the hydraulic rams 40 are partially extended. In these operated positions of the hydraulic arms 25 and 40, the boom arms 19 are positioned substantially in their lowermost position and the bucket 30 is positioned in the digging position at ground level. If the hydraulic rams 40 are then substantially completely extended, the lever assembly 41 will be pivoted counterclockwise as viewed in Figure 2 to move the link 42 to pivot the bucket 30 rearwardly to the position shown in Figure 2. This position is commonly called the break-out position of the bucket, and serves to break away the loaded bucket from the material into which the bucket has been forced by a forward movement of the tractor 10 with the bucket in the digging position shown in Figure 1. With a tractor having a relatively large power plant and in the working of difficult materials such as hard packed earth or gravel, the break-out operation will produce large reaction forces upon the entire loader mechanism. If the gravel or other material is not uniform in density, one side of the bucket 30 in encountering the material of greater density will resist the rearward pivoting of the bucket with a substantially greater force than the other. As a consequence thereof there is a tendency to twist or bend the various elements of the loader. However, because of the defined arrangement of the present invention, a minium of deformation of the loader structure will occur. The relatively wide spacing of the boom bearings 21 and bucket flanges 34 will minimize twisting of the boom, and no twisting of the boom or bucket will be caused by the two hydraulic rams 40, since the lever assembly 41 will prevent any unequal operation of the hydraulic rams 40.

From the position shown in Figure 2, the bucket 30 may be positioned in the normal travel or carrying position shown in Figure 5 by a partial extension of the hydraulic rams 25. It should be noted that due to the relative locations of the pins 18, 44, 36 and 51, the bucket 30 will remain substantially in a full load retention position as it is raised from the position shown in Figure 2 to that shown in Figure 5.

From the position shown in Figure 5, the bucket may be raised to the high lift carrying position by a further extension of the hydraulic rams 25 to produce the position shown in Figure 6. In moving from the position shown in Figure 5 to that shown in Figure 6, the bucket 30 will remain substantially level or in the full load retention position.

To dump the bucket 30, the hydraulic rams 40 are substantially completely retracted such as shown in Figure 7. As the hydraulic rams 40 are retracted, the lever assembly 41 will be pivoted counterclockwise as shown in Figures 16 and 17 to move the links 42 to pivot the bucket 30 clockwise as shown in Figures 6 and 7 to the dump position. The described loader arrangement of the present invention further includes a slight throw-out or snubbing feature which is shown by the intersecting dotted lines through the pins 50 in Figure 7. One of the dotted lines represents the arc of travel of the axis of the pins 50 about shaft 48 and the other dotted line represents the arc of travel of the axis of pins 50 about pins 51. It may be seen by the curves between the two points of intersection of the two curves immediately preceding the end of the dumping operation that the bucket 30 is pivoted slightly rearwardly and forwardly during the last portion of the forward pivoting dumping cycle to jar or shake the bucket and thereby aid in dumping material from the bucket.

From the high lift dump osition, the bucket may be returned to a carrying or digging position by extensions of the hydraulic rams 40. The bucket can also be lowered to ground level by retractions of the hydraulic rams 25. Figure 3 shows the position of the bucket 30 when in the dump position and with the boom substantially lowered to bring the cutting edge to ground level. In such a position the bucket may be used for spreading or grading of any suitable material.

Having described the invention what is considered new and desired to be protected by Letters Patent is:

1. In a tractor loader, a pair of independent boom arms, means pivotally connecting each of said boom arms at one end thereof to said tractor and extending forwardly thereof, a hydraulic ram carried on one side of said tractor and connected to one of said boom arms intermediate the ends thereof for raising and lowering said one boom arm, a second hydraulic ram carried on the other side of said tractor and connected to the other of said boom arms intermediate the ends thereof for raising and lowering said other boom arm, a bucket, means pivotally connecting said bucket to the forward ends of each of said boom arms, a lever assembly comprising a cylindrical member and two levers, each of said levers fixedly connected intermediate its ends on one end of said cylindrical member, a shaft carried between said boom arms, said shaft being of a size small enough relative to said boom arms so that said shaft offers substantially no rigidity to said boom arms, said cylindrical member being pivotally carried on said shaft, means pivotally connecting one end of each of said levers to transversely spaced points on said bucket, a pair of extensible and retractable members, means pivotally mounting said extensible and retractable members on said tractor on opposite sides thereof, means pivotally connecting each of said extensible and retractable members to one of the levers of said pair of levers at the other ends thereof, said cylindrical member being of a size large enough relative to the available forces of said extensible and retractable members so that substantially no twisting of said cylindrical member will occur, whereby said extensible and retractable members pivot said lever assembly by the same amount irrespective of any unequal loading forces on said bucket.

2. In a tractor loader, a pair of independent boom arms, means pivotally connecting each of said boom arms at one end thereof to said tractor and extending forwardly thereof, a hydraulic ram carried on one side of said tractor and connected to one of said boom arms intermediate the ends thereof for raising and lowering said one boom arm, a second hydraulic ram carried on the other side of said tractor and connected to the other of said boom arms intermediate the ends thereof for raising and lowering said other boom arm, a bucket, means pivotally connecting said bucket to the forward ends of each of said boom arms, a lever assembly comprising a cylindrical member and two levers, each of said levers fixedly connected intermediate its ends on one end of said cylindrical member, a shaft carried between said boom arms, said shaft being of a size small enough relative to said boom arms so that said shaft offers substantially no rigidity to said boom arms, said cylindrical member being pivotally carried on said shaft, a pair of links, each of said links being pivotally connected between one end of one of said levers and one side of said bucket, a pair of hydraulic rams, means pivotally mounting said pair of hydraulic rams on said tractor on opposite sides thereof, means pivotally connecting each of said pair of hydraulic rams to the other ends of said levers, said cylindrical member being of a size large enough relative to the available forces of said pair of hydraulic rams so that substantially no twisting of said cylindrical member will occur, so that said pair of hydraulic rams pivot said lever assembly by the same amount irrespective of any unequal loading forces on said bucket.

3. In a tractor loader, a pair of independent boom arms, means pivotally connecting each of said boom arms at one end thereof to said tractor and extending forwardly thereof, a hydraulic ram carried on one side of said tractor and connected to one of said boom arms intermediate the ends thereof for raising and lowering said one boom arm, a second hydraulic ram carried on the other side of said tractor and connected to the other of said boom arms intermediate the ends thereof for raising and lowering said other boom arm, a bucket, means pivotally connecting said bucket to the forward ends of each of said boom arms, a lever assembly comprising a cylindrical member and two levers, each of said levers fixedly connected intermediate its ends on one end of said cylindrical member, a shaft carried between said boom arms, said shaft being of a size small enough relative to said boom arms so that said shaft offers substantially no rigidity to said boom arms, said cylindrical member being pivotally carried on said shaft, a pair of links, each of said links being pivotally connected at one end thereof to one end of one of said levers and at the other end thereof to said bucket on one side thereof and spaced from the pivotal connection of said bucket to said boom arms, a pair of hydraulic rams, means pivotally mounting said pair of hydraulic rams on said tractor on opposite sides thereof and spaced from the pivotal connection of said boom arms to said tractor, means pivotally connecting each of said pair of hydraulic rams to the other ends of said levers, said cylindrical member being of a size large enough relative to the available forces of said pair of hydraulic rams so that substantially no twisting of said cylindrical member will occur, so that said pair of hydraulic rams pivot said lever assembly by the same amount irrespective of any unequal loading forces on said bucket, the relative positions of the pivot axes of said boom arms and said pair of hydraulic rams to said tractor, the pivot axes of said boom arms and said links to said bucket, the pivot axes of said pair of hydraulic rams and said links to said levers and the pivot axis of said cylindrical member on said boom arms being such that the pivot axis of said links to said levers passes through a plane including the pivot axis of said cylindrical member on said boom arms and the pivot axis of said links to said bucket when the pivot axis of said pair of hydraulic rams to said levers approaches a plane including the pivot axis of said pair of hydraulic rams to said tractor and the pivot axis of said cylindrical member on said boom arms when said pair of hydraulic rams are retracted to dump said bucket when said boom arms are fully raised.

4. In a tractor loader, a pair of independent boom arms, means pivotally connecting each of said boom arms at one end thereof to said tractor and extending forwardly thereof, the forward end of each boom arm being provided with a pair of flanges transversely positioned thereon and spaced apart a distance substantially greater than the transverse thickness of said boom arm, a hydraulic ram carried on one side of said tractor and connected to one of said boom arms intermediate the ends thereof for raising and lowering said one boom arm, a second hydraulic ram carried on the other side of said tractor and connected to the other of said boom arms intermediate the ends thereof for raising and lowering said other boom arm, a bucket having two pairs of flanges mounted on the rear wall thereof with each pair being transversely positioned thereon a distance greater than the spacing of said flanges on each of said boom arms, pin means pivotally interconnecting said flanges on said boom arms and said flanges on said bucket, a lever assembly comprising a cylindrical member and two levers, each of said levers fixedly connected intermediate its ends on one end of said cylindrical member, a shaft carried between said boom arms, said shaft being of a size small enough relative to said boom arms whereby said shaft offers substantially no rigidity to said boom arms, said cylindrical member being pivotally carried on said shaft, means pivotally connecting one end of each of said levers to transversely spaced points on said bucket, a pair of extensible and retractable members, means pivotally mounting said extensible and retractable members on said tractor on opposite sides thereof, means pivotally connecting each of said extensible and retractable members to one of the levers of said pair of levers at the other ends thereof, said cylindrical member being of a size large enough relative to the available forces of said extensible and retractable members so that substantially no twisting of said cylindrical member will occur, whereby said extensible and retractable members pivot said lever assembly by the same amount irrespective of any unequal loading forces on said bucket.

5. In a tractor loader, a pair of independent boom arms, means pivotally connecting each of said boom arms at one end thereof to said tractor and extending forwardly thereof, the forward end of each boom arm being provided with a pair of flanges transversely positioned thereon and spaced apart a distance substantially greater than the transverse thickness of said boom arm, a hydraulic ram carried on one side of said tractor and connected to one of said boom arms intermediate the ends thereof for raising and lowering said one boom arm, a second hydraulic ram carried on the other side of said tractor and connected to the other of said boom arms intermediate the ends thereof for raising and lowering said other boom arm, a bucket having two pairs of flanges mounted on the rear wall thereof with each pair being transversely positioned thereon a distance greater than the spacing of said flanges on each of said boom arms, pin means pivotally interconnecting the flanges on said boom arms and the flanges on said bucket, a lever assembly comprising a cylindrical member and two levers, each of said levers fixedly connected intermediate at its ends on one end of said cylindrical member, a shaft carried between said boom arms, said shaft being of a size small enough relative to said boom arms so that said shaft offers substantially no rigidity to said boom arms, said cylindrical member being pivotally carried on said shaft, a pair of links, each of said links being pivotally connected between one end of one of said levers and said bucket on one side thereof, a pair of hydraulic rams, means pivotally mounting said pair of hydraulic rams on said tractor on opposite sides thereof, means pivotally connecting each of said hydraulic rams to the other ends of said levers, said cylindrical member being of a size large enough relative to the available forces of said pair of hydraulic rams so that substantially no twisting of said cylindrical member will occur, so that said pair of hydraulic rams pivot said lever assembly by the same amount irrespective of any unequal loading forces on said bucket.

6. In a tractor loader, a pair of independent boom arms, means pivotally connecting each of said boom arms at one end thereof to said tractor and extending forwardly thereof, the forward end of each boom arm being provided with a pair of flanges transversely positioned thereon and spaced apart a distance substantially greater than the transverse thickness of said boom arm, a hydraulic ram carried on one side of said tractor and connected to one of said boom arms intermediate the ends thereof for raising and lowering said one boom arm, a second hydraulic ram carried on the other side of said tractor and connected to the other of said boom arms intermediate the ends thereof for raising and lowering said other boom arm, a bucket having two pairs of flanges mounted on the rear wall thereof with each pair being transversely positioned thereon a distance greater than the spacing of said flanges on each of said boom arms, pin means pivotally interconnecting the flanges on said boom arms and the flanges on said bucket, a lever assembly comprising a cylindrical member and two levers, each of said levers fixedly connected intermediate its ends on one end of said cylindrical member, a shaft carried between said boom arms, said shaft being of a size small enough relative to said boom arms whereby said shaft offers substantially no rigidity to said boom arms, said cylindrical member being pivotally carried on said shaft, a pair of links, each of said links being pivotally connected at one end thereof to one end of one of said levers and at the other end thereof to said bucket on one side thereof and spaced from the pivotal connection of said bucket to said boom arms, a pair of hydraulic rams, means pivotally mounting said pair of hydraulic rams on said tractor on opposite sides thereof and spaced from the pivotal connection of said boom arms to said tractor, means pivotally connecting each of said pair of hydraulic rams to the other ends of said levers, said cylindrical member being of a size large enough relative to the available forces of said pair of hydraulic rams so that substantially no twisting of said cylindrical member will occur, so that said pair of hydraulic rams pivot said lever assembly by the same amount irrespective of any unequal loading forces on said bucket, the relative positions of the pivot axes of said boom arms and said pair of hydraulic rams to said tractor, the pivot axes of said boom arms and said links to said bucket, the pivot axes of said pair of hydraulic rams and said links to said levers, and the pivot axis of said cylindrical member on said boom arms being such that the pivot axis of said links to said levers passes through a plane including the pivot axis of said cylindrical member on said boom arms and the pivot axis of said links to said bucket when the pivot axis of said pair of hydraulic rams to said levers approaches a plane including the pivot axis of said pair of hydraulic rams to said tractor and the pivot axis of said cylindrical member on said boom arms when said pair of hydraulic rams are retracted to dump said bucket when said boom arms are fully raised.

References Cited in the file of this patent

UNITED STATES PATENTS

| | | |
|---|---|---|
| 2,672,994 | Werner | Mar. 23, 1954 |
| 2,746,624 | Stueland | May 22, 1956 |
| 2,846,097 | Beyerstedt | Aug. 5, 1958 |
| 2,860,794 | Paluck | Nov. 18, 1958 |